March 5, 1968     W. W. WAHLGREN     3,372,325
READILY SERVICEABLE POWER SUPPLY ASSEMBLY
Filed Nov. 13, 1964     3 Sheets-Sheet 1
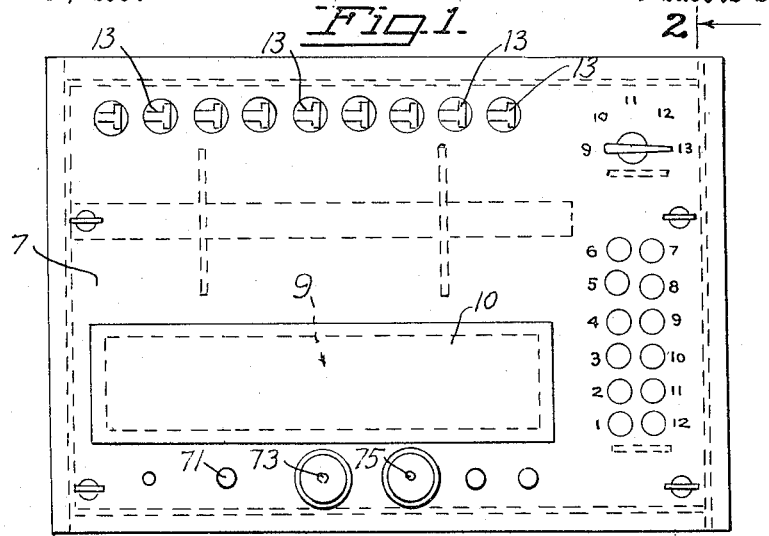
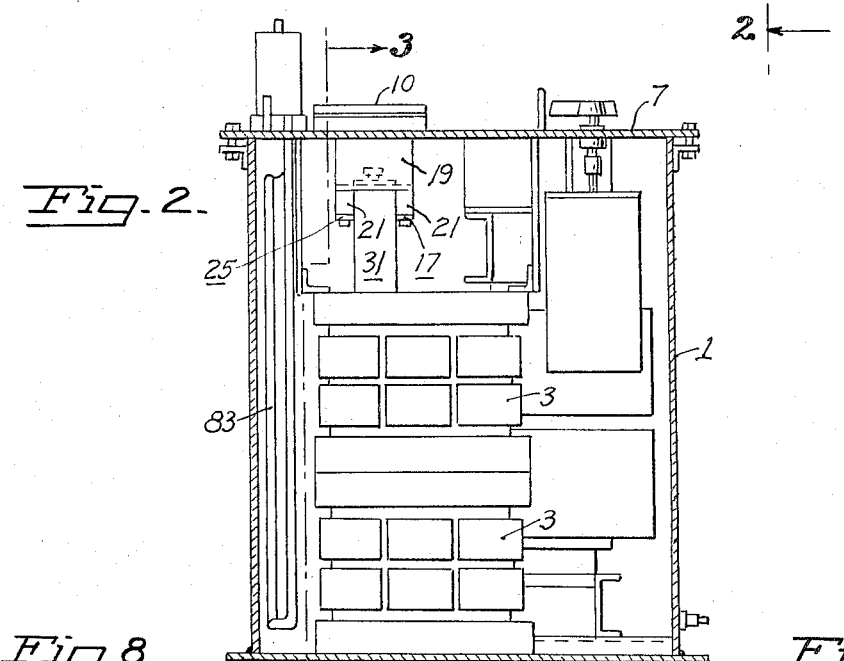
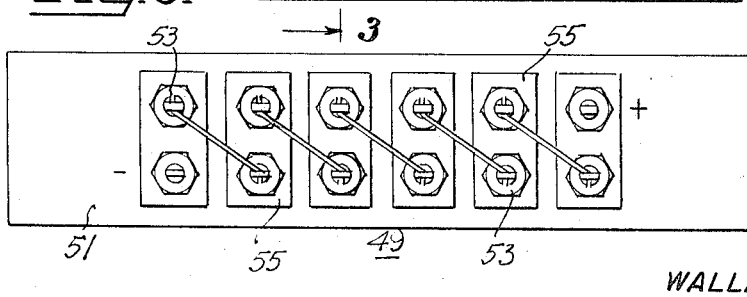
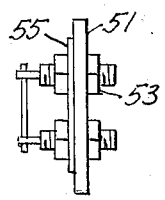
INVENTOR
WALLACE W. WAHLGREN
BY
Bruce + Brosler
HIS ATTORNEYS March 5, 1968 W. W. WAHLGREN 3,372,325
READILY SERVICEABLE POWER SUPPLY ASSEMBLY
Filed Nov. 13, 1964 3 Sheets-Sheet 2
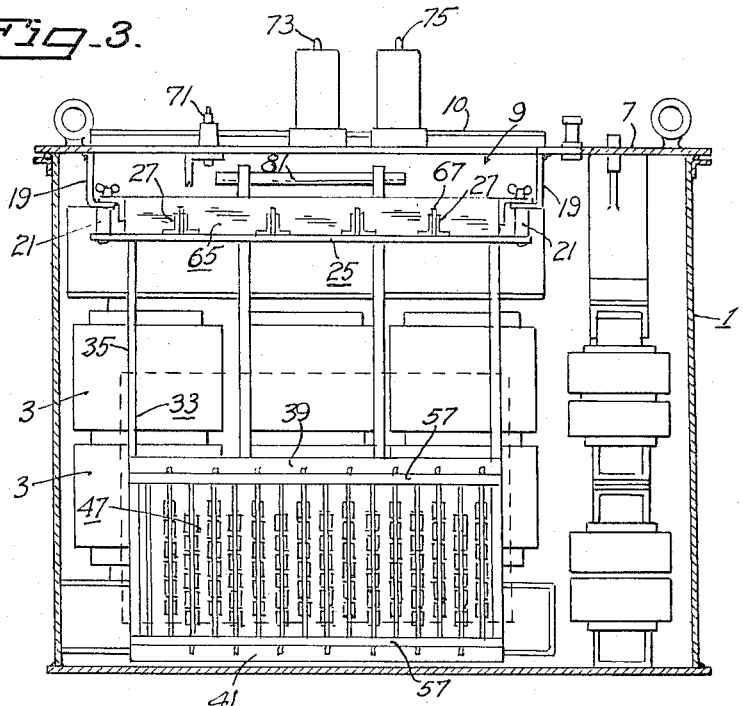
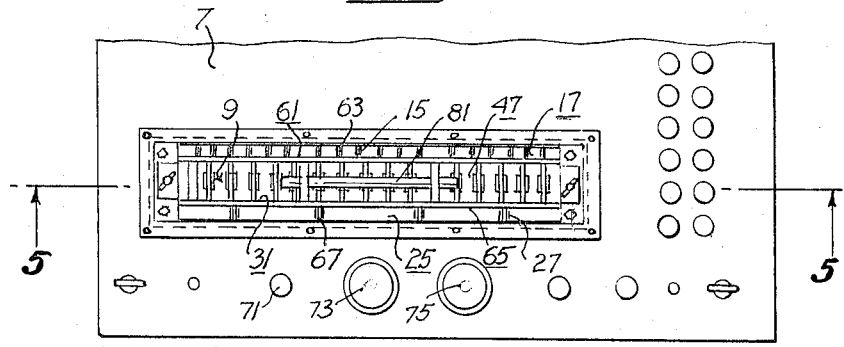
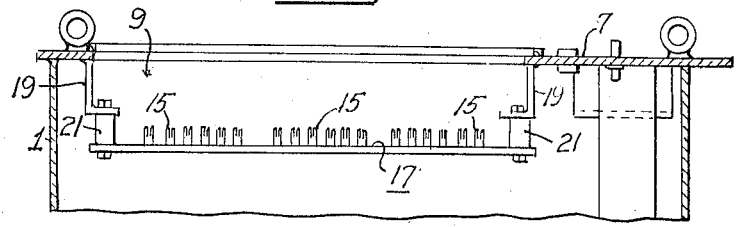
INVENTOR
WALLACE W. WAHLGREN
BY
Bruce & Brosler
HIS ATTORNEYS March 5, 1968 W. W. WAHLGREN 3,372,325
READILY SERVICEABLE POWER SUPPLY ASSEMBLY
Filed Nov. 13, 1964 3 Sheets-Sheet 3

INVENTOR
WALLACE W. WAHLGREN
BY
Bruce & Brosler
HIS ATTORNEYS

United States Patent Office 3,372,325
Patented Mar. 5, 1968

3,372,325
READILY SERVICEABLE POWER SUPPLY
ASSEMBLY
Wallace W. Wahlgren, Oakland, Calif., assignor, by mesne assignments, to The Rucker Company, Oakland, Calif.
Filed Nov. 13, 1964, Ser. No. 410,983
4 Claims. (Cl. 321—8)

ABSTRACT OF THE DISCLOSURE

A readily serviceable power supply in which a rectifier rack is insertable through an opening in the transformer cover, to automatically effect circuit connections within the transformer casing, through complementary terminal strips.

My invention relates to A.C. to D.C. power supplies involving rectifiers, and more particularly to a physical assembly of the components involved.

Power supplies to which the present invention relates, basically include transformers, rectifiers, and various combinations involving condensers, resistors, and/or inductors.

As load equipment, which is supplied by such type power source, is developed to handle increased power, the associated power supply must be electrically enlarged to meet the demand in power. The transformers, thus become larger and heavier and increased numbers of rectifiers are required to meet the increased voltage and current requirements of the equipment to be supplied.

The ability to handle such increased power loads, under tolerable temperature conditions, necessitates withdrawal of heat, if the apparatus is not to be constructed oversize.

Prior practice involved use of conventional types of cooled transformers, and treating the rectifiers by installing the same in a bath of cooling medium such as oil or a gaseous atmosphere. Thus not only is the transformer casing provided with terminals protected by terminal bushings, but inasmuch as the voltages at the rectifiers are of comparable value, the casings in which the rectifiers are housed, must also be provided with terminals protected by terminal bushings.

In the installation of such equipment, connections must then be made from the output terminals of the transformers to the input terminals of the rectifiers, and when such power units are of the multi-phase type, the number of such connections become quite substantial.

Among the objects of my invention are:

(1) To provide a novel and improved power supply assembly;

(2) To provide a novel and improved power supply assembly which is condensed into a single unit assembly;

(3) To provide a novel and improved power supply assembly in which there are no exposed connections between the transformer secondaries and the input side of the rectifiers;

(4) To provide a novel and improved power supply assembly which has structurally been considerably simplified, without impairing the ability to conveniently service component parts thereof;

(5) To provide a novel and improved power supply assembly in which loose or flexible connections between components of the assembly have been eliminated;

(6) To provide a novel and improved power supply assembly providing a common cooling medium for both the transformer and the rectifier components.

Additional objects of my invention will be brought out in the following description of a preferred embodiment of the same, taken in conjunction with the accompanying drawings wherein:

FIGURE 1 is a plan view of the power supply assembly of the present invention;

FIGURE 2 is a view through the assembly of FIGURE 1 taken in the plane 2—2 of FIGURE 1;

FIGURE 3 is a view taken in the planes 3—3 of FIGURE 2;

FIGURE 4 is a view depicting an interior feature of the assembly of FIGURE 1, as seen through a cover opening in the tank thereof;

FIGURE 5 is a view in elevation of the feature of FIGURE 4;

FIGURE 8 is a plan view of a diode board assembly component of the rack assembly of FIGURE 7;

FIGURE 9 is an edge view of the diode board assembly of FIGURE 8.

Figure 6:
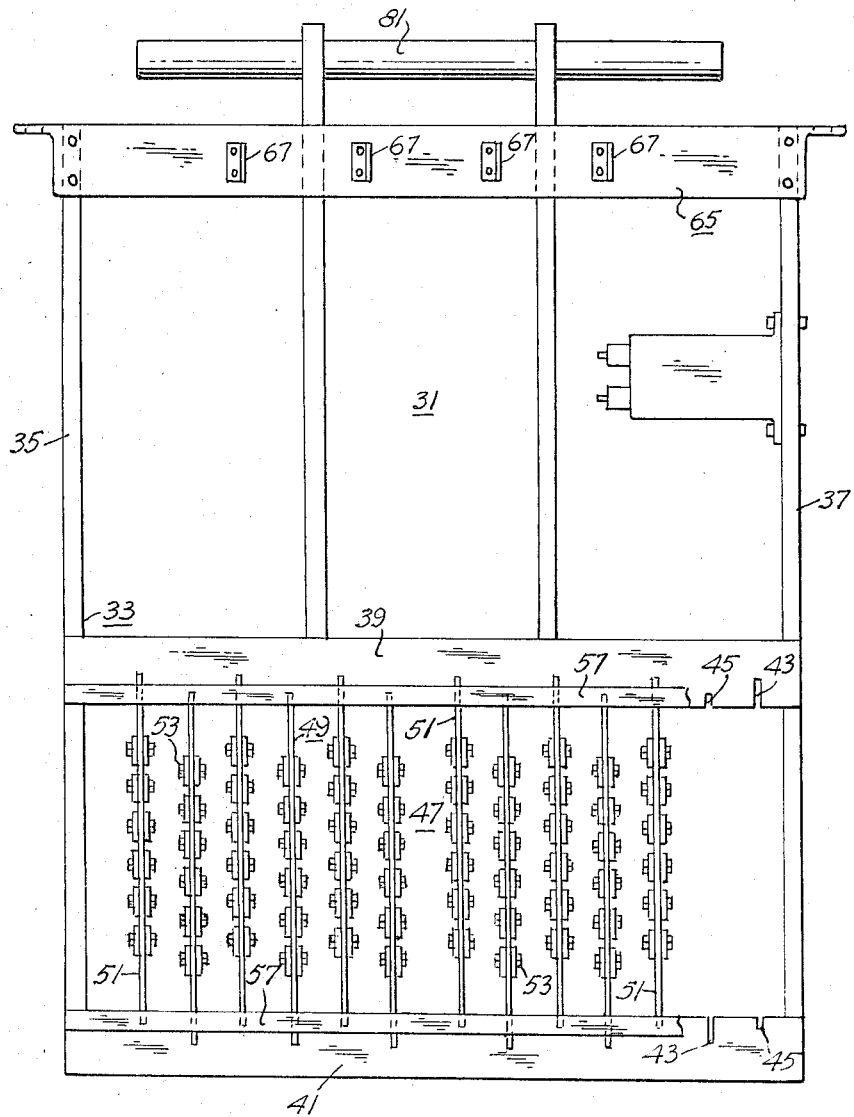
FIGURE 6 is a view in elevation of a rack assembly involved in the power supply assembly of FIGURE 1.
Figure 7:
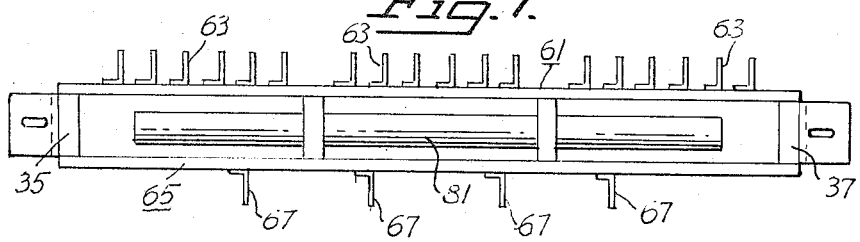
FIGURE 7 is a plan view of the rack assembly of FIGURE 6.

Referring to the drawings for details of my invention in its preferred form, the same involves a tank or casing 1 in which is supported the necessary requirement of transformers 3, each transformer including the customary core and primary and secondary windings. The casing is sealed by a closure 7 spanning the upper edges thereof and bolted thereto with proper sealing. This closure is provided with an opening 9 therein, preferably of elongated rectangular configuration, adapted to receive a cover 10.

The number and arrangement of transformers and the manner of sealing the closure to the upper edges of the casing are not critical elements of the present invention. It is only essential, that whatever transformers are required, that they be so located within the casing as not to overlap to any material extent, the space beneath the closure opening.

On the closure, preferably along one side thereof, are a plurality of input terminals 13 which are connected interiorly of the casing to the primary windings of the transformers, the number of such terminals being a function of the number of connections employed. These terminals provide for connection of alternating current power to the transformers in question.

Terminals 15 for the output leads of the secondary windings of said transformers, are included in a terminal strip 17 within the casing and located in a vertical plane through the opening, preferably a vertical plane adjacent one side of said opening 9.

To support this terminal strip, a depending L-shaped bracket 19 (FIGURE 5) is welded or otherwise affixed to the underside of the closure 7 along each end of the opening 9. The base of each bracket lies within the opening as viewed from above, and extends substantially the width of such opening. From the corresponding end of each depends a spacer tube 21 to which is clamped one end of the terminal strip.

Another terminal strip 25 (FIGURE 3) with terminals 27, is similarly suspended from these brackets, from the opposite ends thereof, whereby the terminal strips occupy parallel spaced positions with each lying in a vertical plane adjacent a long edge of the opening.

The spacing between terminal strips is such as to permit of the insertion therebetween, of a rack 31, installed through the opening. This rack basically involves a frame 33 (FIGURE 6) comprising a pair of spaced apart end frame members 35, 37, spanned by a pair of parallel spaced transverse members 39, 41 having aligned opposing slots 43, 45 formed therein, with the alternate slots 43 preferably being deeper and disposed opposite the shallower slots 45 of the other cross member.

These slotted transverse members are designed to support a rectifier bank 47 including a plurality of diode assemblies 49, each of which comprises a diode mounting board 51 of insulation, adapted to fit into opposing slots 43, 45 and be removably supported by the transverse members.

Each mounting board has mounted thereon, a plurality of diodes 53 provided with heat sinks 55 in heat conductive relationship thereto, the diodes being of the solid state type.

Narrow strips 57 of insulation, along the slotted edges of the transverse members, serve to retain the diode assemblies in place against accidental shift from their installed positions.

The diodes are connected up in any manner necessary to satisfy the requirements of the apparatus. The input terminal leads to the rectifier bank are connectible to a terminal strip 61 affixed transversely of the frame to the end frame members, adjacent the upper end thereof, and carrying terminals 63 complementary to the terminals 15 of terminal strip 17, while the output terminal leads of the rectifier bank are connectible to a second terminal strip 65 similarly affixed to the frame on the opposite side thereof and carrying terminals 67 which are complementary to the terminals 27 of the terminal strip 25.

The terminals 27 of the terminal strip 25 are connectible to terminals 71, 73, 75 . . . etc., mounted on the casing closure 7, which terminals represent the output terminals of the power supply unit, one of which 71, may be a ground terminal, while the others may represent output voltages of different values.

Thus, when the rack is installed through the closure opening, the rectifier bank will automatically be connected in proper relationship to the transformer components and the output terminals, and should it become necessary to check or service the rectifier bank, the same may be conveniently withdrawn without disturbing the other components of the power supply assembly, and with the high voltage terminals of the transformer secondaries, remaining within the casing where accidental contact by anyone is unlikely.

To facilitate the installation and removal of the rectifier bank, the rack is provided with a handle 81, above the elevation of the terminal strips on the rack, to maintain one's hand safely removed from possible contact with the terminals of any of these terminal strips.

The apparatus as thus installed in the casing, is cooled to permit of designing the apparatus to a minimum size, and in its preferred form, the casing is filled with transformer oil to the point of submerging the components to be cooled. The edge mounting of the diode assemblies as illustrated and described, provides for efficient contact of the oil with all components, whereby it may effectively withdraw heat from the heat sinks as well as the other components within the casing. In this connection, the arrangement of the slots results in a staggering of the diode assemblies to effect more effective cooling of these components. The heat absorbed into the oil, may be withdrawn from the casing by a cooling coil 83 submerged in the oil of casing, adjacent one side wall thereof.

From the foregoing description of my invention in its preferred form, it will be apparent that the same fulfills the objects of my invention, and while I have illustrated and described the same in its preferred form, it is apparent that the same is subject to alteration and modification without departing from the underlying principles involved, and I accordingly, do not desire to be limited in my protection, to the specific details illustrated and described, except as may be necessitated by the appended claims.

I claim:

1. A power supply assembly comprising in combination,
a casing including a closure,
said closure having an opening therein,
a transformer including a core and a secondary winding thereon, supported within said casing,
a terminal strip,
means supporting said terminal strip within said casing and in a vertical plane through said opening,
connections from the secondary winding of said transformer to said terminal strip,
a rack adapted for insertion into said casing through said closure opening,
a plurality of rectifiers carried by said rack,
a complementary terminal strip,
means supporting said complementary terminal strip on said rack in position to make contact with terminals on said first terminal strip, when said rack is installed in said casing,
connections from said rectifiers to terminals of said complementary terminal strip,
and a cover for said closure opening.

2. A power supply assembly comprising in combination,
a casing including a closure,
said closure having an opening therein,
a transformer including a core and a secondary winding thereon, supported within said casing,
a terminal strip,
means supporting said terminal strip within said casing and within view through said opening,
connections from the secondary winding of said transformer to said terminal strip,
a rack adapted for insertion into said casing through said closure opening, and having a hand grip for use in installing and removing same,
a plurality of rectifiers carried by said rack,
a complementary terminal strip,
means supporting said complementary terminal strip on said rack in position to make contact with terminals on said first terminal strip, when said rack is installed in said casing,
connections from said rectifiers to terminals of said complementary terminal strip, and
a cover for said closure opening.

3. A power supply assembly comprising in combination,
a casing including a closure,
said closure having an opening therein,
a transformer including a core and a secondary winding thereon, supported within said casing,
a terminal strip,
means supporting said terminal strip within said casing and in a vertical plane through said opening,
connections from the secondary winding of said transformer to said terminal strip,
a rack adapted for insertion into said casing through said closure opening, and having a hand grip for use in installing and removing same,
a plurality of rectifiers carried by said rack,
a complementary terminal strip,
means supporting said complementary terminal strip on said rack in position to make contact with terminals on said first terminal strip, when said rack is installed in said casing,
connections from said rectifiers to terminals of said complementary terminal strip,
a cover for said closure opening,
and a cooling medium common to both said transformer and said rectifiers.

4. A power supply assembly comprising in combination,
a casing including a closure with terminals mounted thereon,
said closure having an opening therein,
a transformer including a core and a secondary winding thereon, supported within said casing,
a pair of terminal strips,
means supporting said terminal strips within said casing and in spaced vertical planes through said opening, connections from the secondary winding of said transformer to one of said terminal strips,
connections from said other terminal strip to said closure mounted terminals,
a rack adapted for insertion into said casing through said closure opening, and having a hand grip for use in installing and removing same,
a plurality of rectifiers carried by said rack,
a pair of terminal strips, each complementary to one of said casing installed terminal strips,
means supporting said complementary terminal strips on said rack in position to make contact with terminals on the casing installed terminal strips, when said rack is installed in said casing,
connections from said rectifiers to terminals of said complementary terminal strips, and
a cover for said closure opening.

References Cited
UNITED STATES PATENTS

| | | | |
|---|---|---|---|
| 1,905,629 | 4/1933 | Corbitt | 317—234 |
| 3,069,615 | 12/1962 | Jensen | 321—8 |
| 2,922,081 | 1/1960 | Dubin | 317—101 X |
| 3,218,518 | 11/1965 | Ashbridge et al. | 317—101 |

JOHN F. COUCH, *Primary Examiner.*

W. H. BEHA, JR., *Assistant Examiner.*